United States Patent
Jeong et al.

(10) Patent No.: US 11,082,836 B2
(45) Date of Patent: Aug. 3, 2021

(54) ACCESS POINT AND METHOD FOR CONNECTING COMMUNICATION WITH EXTERNAL DEVICE THEREOF

(71) Applicant: SAMSUNG ELECTRONICS CO., LTD., Suwon-si (KR)

(72) Inventors: Daeyeon Jeong, Suwon-si (KR); Hosung Kim, Suwon-si (KR); Sanggyu Lee, Suwon-si (KR); Haesik Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 16/361,662

(22) Filed: Mar. 22, 2019

(65) Prior Publication Data

US 2019/0297493 A1  Sep. 26, 2019

(30) Foreign Application Priority Data

Mar. 22, 2018 (KR) .......................... 10-2018-0032976

(51) Int. Cl.
*H04L 9/14* (2006.01)
*H04W 12/041* (2021.01)
*H04W 12/0431* (2021.01)

(52) U.S. Cl.
CPC ............. *H04W 12/041* (2021.01); *H04L 9/14* (2013.01); *H04W 12/0431* (2021.01)

(58) Field of Classification Search
None
See application file for complete search history.

(56) References Cited

U.S. PATENT DOCUMENTS

| | | |
|---|---|---|
| 7,483,409 B2 | 1/2009 | Zheng |
| 7,499,548 B2 | 3/2009 | Meandzija et al. |
| 7,586,889 B2 | 9/2009 | Gassho et al. |
| 8,176,328 B2 | 5/2012 | Chen et al. |
| 9,118,936 B2 * | 8/2015 | Parker .............. H04N 21/43615 |
| 9,351,158 B2 | 5/2016 | Wright et al. |
| 9,453,299 B2 | 9/2016 | Park et al. |
| 9,706,397 B2 | 7/2017 | Benoit et al. |

(Continued)

FOREIGN PATENT DOCUMENTS

WO   2014/060873   4/2014

*Primary Examiner* — Cai Y Chen
(74) *Attorney, Agent, or Firm* — Nixon & Vanderhye, P.C.

(57) ABSTRACT

A communication connection method of an access point is provided. The communication connection method according to an embodiment includes acquiring information of a first encryption key corresponding to an external device from a user terminal based on a request for communication connection using the first encryption key being received from the external device, performing a communication connection with the external device using the first encryption key, generating a second encryption key corresponding to the external device while the communication connection using the first encryption key is performed, transmitting the generated second encryption key to the external device, and performing the communication connection with the external device using the generated second encryption key based on a request for communication connection using the generated second encryption key being received from the external device after the communication connection using the first encryption key is terminated.

18 Claims, 9 Drawing Sheets

(56) References Cited

U.S. PATENT DOCUMENTS

| | | |
|---|---|---|
| 9,749,134 B2 | 8/2017 | Perez et al. |
| 10,305,684 B2 * | 5/2019 | Pang .................... H04L 9/3215 |
| 2007/0253390 A1 | 11/2007 | Gassho et al. |
| 2012/0130902 A1 | 5/2012 | Dingler et al. |
| 2016/0260002 A1 * | 9/2016 | Hill ........................ G06F 21/36 |
| 2018/0183581 A1 * | 6/2018 | Elbaz ................... H04L 63/061 |

* cited by examiner

ACCESS POINT AND METHOD FOR CONNECTING COMMUNICATION WITH EXTERNAL DEVICE THEREOF

CROSS-REFERENCE TO RELATED APPLICATION

This application is based on and claims priority under 35 U.S.C. § 119 to Korean Patent Application No. 10-2018-0032976, filed on Mar. 22, 2018, in the Korean Intellectual Property Office, the disclosure of which is incorporated by reference herein in its entirety.

BACKGROUND

1. Field

The disclosure relates to an access point and a communication connecting method thereof, and, for example, to an access point capable of performing communication connection with an external device using an encryption key generated by an access point and a communication connecting method thereof.

2. Description of Related Art

Recently, a network environment in which various external devices (e.g., Internet of Things (IoT) devices) without input/output devices such as displays have been increasingly used. Such the IoT device may access a network using an access point.

Conventionally, in order to access an IoT device using an access point, a process of selecting an access point using a user terminal connected to the IoT device, and inputting an encryption key needs to be performed.

Figure 1:
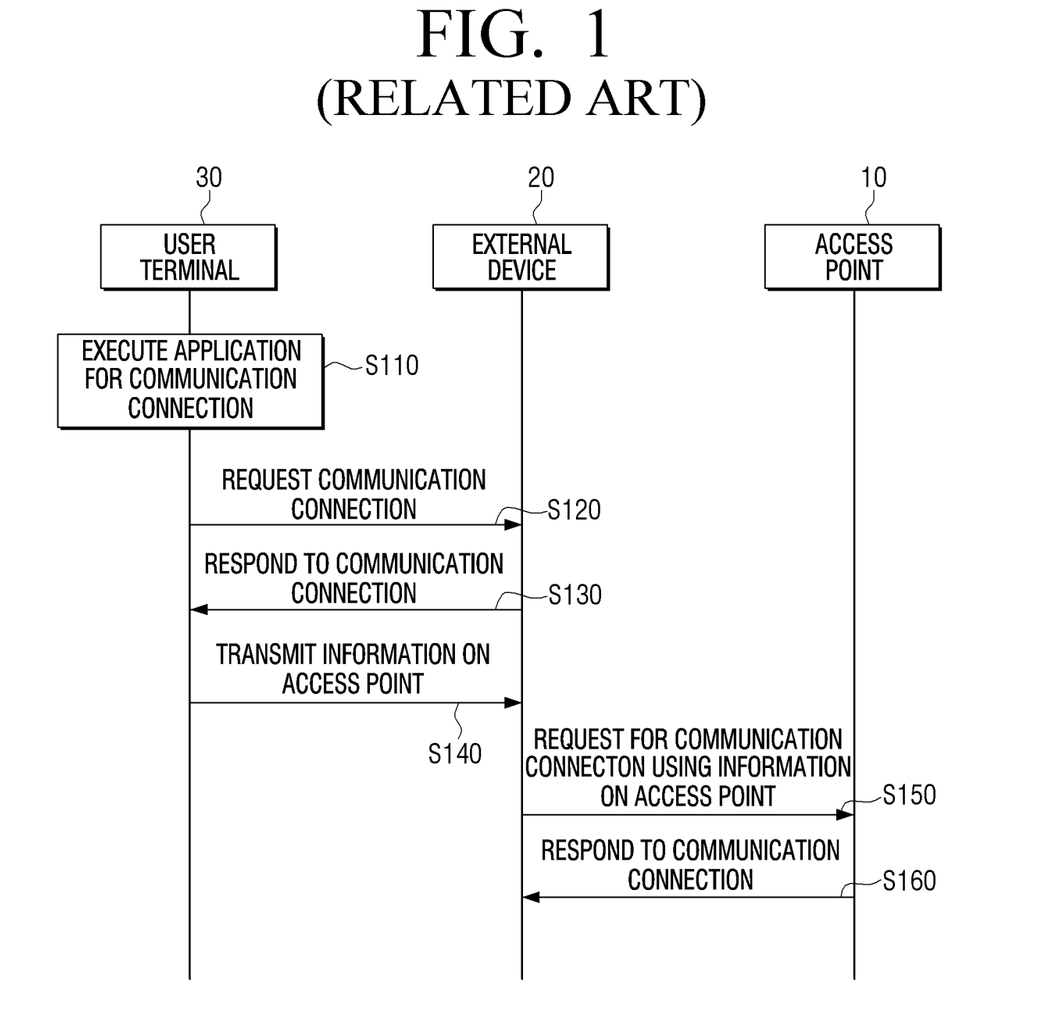
FIG. 1 is a sequence diagram illustrating a conventional method of accessing an access point.

For example, referring to FIG. 1, a user terminal 30 may execute an application for communication connection at step S110. The user terminal 30 may acquire information on an access point (e.g., ID, encryption key, etc. of the access point) according to a user input received through an execution screen of an application.

The user terminal 30 may request a communication connection with an external device 20 at step S120, the external device 20 may transmit a communication connection response in response to the communication connection request to the user terminal 30 at step S130, and the communication connection between the user terminal 30 and the external device 20 may be established. The user terminal 30 and the external device 20 may perform communication connection using a WiFi-direct method.

The user terminal 30 may transmit information on the access point to the external device 20 at step S140.

The external device 200 may request a communication connection to an access point 10 using information on the access point at step S150, the access point 10 may transit a communication connection response in response to the communication connection request at step S160, and communication connection between the external device 20 and the access point 10 may be established.

In other words, according to a conventional communication connection method, encryption key information of the access point input by a user is stored in an external device (e.g., an IoT device), and there is a risk that confidentiality may be compromised by hacking. In addition, when connecting a plurality of IoT devices to an access point, there may be a problem that information on the access point needs to be input to each of the plurality of IoT devices, and this could be bothersome to a user.

SUMMARY

Example embodiments of the disclosure relate to providing an access point that enables an external device to access an access point using a public encryption key corresponding to an external device and a personal encryption key generated by an access point and a communication connection method thereof.

According to an example embodiment, a communication connection method of an access point is provided, the method including acquiring information on a first encryption key corresponding to an external device from a user terminal based on a request for a communication connection using the first encryption key being received from the external device, performing the communication connection with the external device using the first encryption key, generating a second encryption key corresponding to the external device while the communication connection using the first encryption key is performed, transmitting the generated second encryption key to the external device, and performing the communication connection with the external device using the second encryption key based on a request for communication connection using the generated second encryption key being received from the external device after the communication connection using the first encryption key is terminated.

The method may further include switching a communication mode of the access point to a first encryption key allowance mode based on the information on the first encryption key being acquired, wherein the performing of the communication connection using the first encryption key comprises, performing the communication connection with the external device using the first encryption key based on the request for the communication connection using the first encryption key being received from the external device while the first encryption key allowance mode is maintained.

The first encryption key allowance mode may be maintained during a period of time set by a user through the user terminal.

The method may further include terminating the communication connection with the external device using the first encryption key based on the generated second encryption key being transmitted or the first encryption key allowable mode being terminated.

The method may further include deleting the first encryption key based on the communication connection with the external device using the first encryption key being terminated.

The generating may include generating the second encryption key corresponding to the external device based on information on the external device.

The transmitting may include transmitting information on the access point together with the second encryption key corresponding to the external device, wherein the performing of the communication connection using the second encryption key comprises performing the communication connection with the external device using the second encryption key using the information on the access point and the second encryption key corresponding to the external device.

The second encryption key may be stored regardless of whether the communication connection with the external device using the second encryption key is terminated or not.

The external device may be a Internet of Things (IOT) device without a display.

According to an example embodiment, an access point is provided, the access point including a communicator comprising communication circuitry, a memory including at least one command, and a processor connected to the communicator and the memory, the processor being configured to control the access point, wherein the processor, by executing the at least one command, is further configured to control the access point to: acquire information on a first encryption key corresponding to an external device from a user terminal through the communicator, perform a communication connection with the external device using the first encryption key through the communicator based on a request for communication connection using the first encryption key being received from the external device, generate a second encryption key corresponding to the external device while the communication connection using the first encryption key is performed, control the communicator to transmit the generated second encryption key to the external device, and perform a communication connection with the external device using the second encryption key through the communicator based on a request for communication connection using the second encryption key being received from the external device after the communication connection using the first encryption key is terminated.

The processor may be further configured to control the access point to, switch a communication mode of the access point to a first encryption key allowance mode based on the information on the first encryption key being acquired, and perform the communication connection with the external device using the first encryption key through the communicator based on the request for the communication connection using the first encryption key being received from the external device while the first encryption key allowance mode is maintained.

The first encryption key allowance mode may be maintained during a period of time set by a user through the user terminal.

The processor may terminate the communication connection with the external device using the first encryption key, based on the generated second encryption key being transmitted or the first encryption key allowance mode being terminated,.

The processor may delete the first encryption key, based on the communication connection with the external device using the first encryption key being terminated.

The processor may generate the second encryption key corresponding to the external device based on information on the external device.

The processor may be further configured to control the communicator to transmit the second encryption key corresponding to the external device together with information on the access point, and perform the communication connection with the external device using the second encryption key using the information on the access point together with the second encryption key corresponding to the external device.

The second encryption key may be stored in the memory regardless of whether the communication connection with the external device using the second encryption key is terminated or not.

The external device may be a Internet of Things (IOT) device without a display.

According to the above-described various example embodiments, a user may enable a plurality of IoT devices to access an access point by simply registering personal encryption keys corresponding to the plurality of IoT devices to an access point. Conventionally, the security cannot be guaranteed because a master encryption key is stored in an external device, but according to the present disclosure, an individual encryption key may be given to each external device, and a master encryption key is stored in an external device and, thus, leaking of the key to the outside may be prevented and/or reduced and thus, security may be enhanced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

It is to be understood that the disclosure herein is not intended to limit the scope to the various described example embodiments, but includes various modifications, equivalents, and/or alternatives of the embodiments. In the description of the drawings, like reference numerals refer to like elements throughout the description of drawings.

According to the present disclosure, the expressions "include," "comprise," "including," and "comprising" indicate that one or more components, steps, operations, and elements exist or are added, and do not exclude the presence of additional features.

In the present disclosure (including the appended claims), the expressions "A or B," "A and/or B" "at least one of A and/or B," "one or more of A and/or B," "at least one of A or B," or "one or more of A or B" and the like include all possible combinations of the listed items. For example, "A or B," "at least one of A and B," or "at least one of A or B" refers to (1) includes at least one A, (2) includes at least one B or (3) includes at least one A and at least one B.

Terms such as "first" and "second" may be used to distinguish various elements regardless of order and/or importance. Those terms are only used for the purpose of differentiating a component from other components.

When an element (e.g., a first element) is referred to as being "operatively or communicatively coupled to" or "connected to" another element (e.g., a second element), it should be understood that each element is directly connected or indirectly connected via another element (e.g., a third element). However, when an element (e.g., a first constituent) is referred to as being "directly coupled to" or "directly connected to" another element (e.g., a second element), it should be understood that there is no other elements (e.g., a third element) interposed therebetween.

The expression "configured to" as used in the present disclosure can refer to, for example, "suitable for," "having the capacity to," "designed to," "adapted to," "made to," or "capable of" depending on the situation. The term "configured to (or set to)" may not necessarily denote "specifically designed to" in hardware. Instead, in some circumstances, the expression "a device configured to" may refer, for example, to a situation in which the device "is able to~" with other devices or components. For example, "a sub-processor configured to (or set to) execute A, B, and C" may be implemented, for example, and without limitation, as a processor dedicated to performing the operation (e.g., an embedded processor), a generic-purpose processor (e.g., a central processor unit (CPU) or an application processor) that can perform the corresponding operations, or the like.

Hereinafter, the disclosure will be described in greater detail with reference to the drawings.

Figure 2:
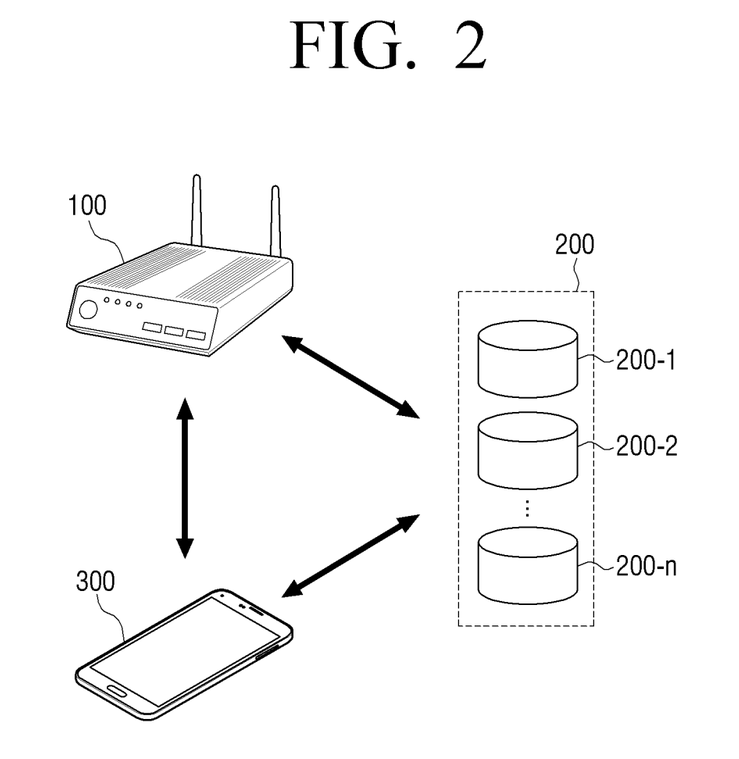
FIG. 2 is a diagram illustrating an example system including a plurality of external devices, a user terminal, and an access point according to an embodiment of the disclosure.

FIG. 2 is a diagram illustrating an example system for performing communication connection between an external device and an access point according to an embodiment of the disclosure.

The system may include an access point 100, a plurality of external devices 200-1, 200-2, . . . and 200-n, and a user terminal 300. The access point 100 may be an apparatus for connecting the external device 20 to a home network system, and may be implemented as a separate device. However, the access point 100 may be implemented as home appliances, such as, for example, and without limitation, a refrigerator, a washing machine, a TV or the like. In addition, the external device 200 may be implemented as an IoT device that does not include an output device such as a display, but may be implemented as other home appliances such as, for example, and without limitation, a refrigerator, a washing machine, a TV, and the like. The user terminal 300 may be implemented as a portable terminal such as, for example, and without limitation, a smart phone, a tablet PC, a laptop, or the like. However, the user terminal 300 may be implemented as a product such as, for example, and without limitation, a desktop PC, a TV, or the like.

The user terminal 300 may acquire information on an external device based on a user input. The user terminal 300 may acquire a first encryption key (hereinafter referred to as "public encryption key") corresponding to an external device. The user terminal 300 may acquire information on the public encryption key by direct input, but disclosure is not limited thereto. The user terminal 300 may acquire information on the public encryption key by, for example, and without limitation, capturing a bar code, or QR code, etc. provided, for example, and without limitation, in an external device, a box wrapping the external device, etc.

The public encryption key may, for example, be an encryption key given when the external device 200 is manufactured, and could vary depending on the type of the external device 200, but the disclosure is not limited thereto. The public encryption key may vary depending on the manufacturer, product type, product name, etc. of the external device 200.

The user terminal 300 may transmit information on the acquired public encryption key to the access point 100.

The access point 100 may perform communication connection with at least one external device based on the acquired public encryption key. For example, when the external device 200 transmits a communication connection request using a public encryption key to the access point 100, the access point 100 may perform communication connection with the external device 200 using a public encryption key included in a communication connection request signal and a public encryption key received from the user terminal 300.

Based on the communication connection being performed (established), the access point 100 may generate a second encryption key (hereinafter referred to as "personal encryption key") for communication connection with the external device 200. The personal encryption key may be a unique encryption key given to the external device 200 which is generated by the access point 100, and generated based on the information on the external device 200.

The access point 100 may transmit the information on the personal encryption key to the external device 200. The access point 100 may transmit the information on the access point 100 (e.g., SSID information, Mac address information, etc.) together with the personal encryption key.

When the personal encryption key is transmitted or a predetermined time passes, the access point 100 may terminate a communication connection with the external device 200 using the public encryption key. The access point 100 may delete the public encryption key from a memory.

Based on the communication connection using the public encryption key being terminated, the external device 200 may request communication connection using information on the personal encryption key generated by the access point 100. The external device 200 may a communication connection signal including the information on the personal encryption key to the access point 100.

The access point 100 may authenticate the external device 200 based on the information on the personal encryption key included in the communication connection request signal, and based on the authentication result, transmit a communication connection response signal to the external device 200, and then perform a communication connection with the external device 200.

The access point 100 may temporarily perform a communication connection with the external device 200 using the public encryption key, perform a communication connection with the external device 200 using the personal encryption key received while performing communication connection using the public encryption key.

Figure 3A:
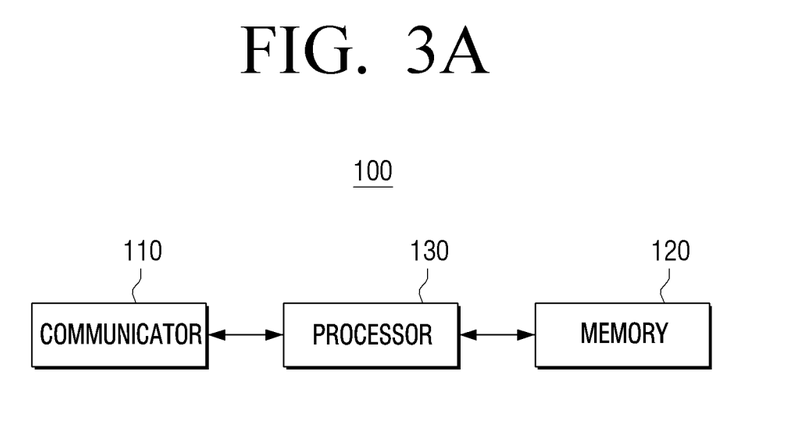
FIG. 3A is a block diagram illustrating an example configuration of an access point according to an embodiment of the disclosure.

FIG. 3A is a block diagram illustrating an example configuration of an access point 100 according to an embodiment of the disclosure. Referring to FIG. 3A, the access point 100 may include a communicator (e.g., including communication circuitry) 110, a memory 120 and a processor (e.g., including processing circuitry) 130. The configurations illustrated in FIG. 3A are illustrative examples of example embodiments of the disclosure, and appropriate hardware/software configurations that will be apparent to those skilled in the art can be further included in the access point 100.

The communicator 110 may include various communication circuitry and perform communication with various external devices. The communicator 110 may perform communication with the external device 200 and the user terminal 300. For example, the communicator 110 may receive the public encryption key corresponding to the external device 200 from the user terminal 300. In addition, the communicator 110 may perform communication with the external device 200 using the public encryption key corresponding to the external device 200. The communicator 110 may transmit a personal encryption key corresponding to the external device 200 while communicating with the external device 200 using the public encryption key. Based on the communicator 110 terminating the communication connection with the external device 200 using the public cryptographic key, the communicator 110 may perform a communication connection with the external device 200 using the personal public encryption key corresponding to the external device 200.

The communicator 110 may be implemented as various modules including various communication circuitry, such as, for example, and without limitation, a Wi-Fi module, or the like. For example, the Wi-Fi module of the communicator 110 may receive the connection information (e.g., SSID, encryption key information, etc.) received from the user terminal 300 and the external device 200, and may perform communication with the user terminal 300 and the external device 200.

The memory 120 may store at least one command or data related to at least one other component of the access point 100. The memory 120 may be implemented with, for example, and without limitation, a non-volatile memory, a volatile memory, a flash memory, a hard disk drive (HDD), a solid state drive (SSD), or the like. The memory 120 may be accessed by the processor 130 and read/write/modify/delete/update of data by the processor 130 may be performed. The term 'memory' in this disclosure may, for example, and without limitation, include the memory 120, and a memory card (not shown) (e.g., a micro SD card, a memory stick, etc.) mounted in ROM (not shown), RAM (not shown) or the access point 100 in the processor 130.

The memory 120 may store the public encryption key corresponding to the external device 200 received from the user terminal 100. If a preset time elapses or the communication connection using the public encryption key is terminated, the public encryption key corresponding to the external device 200 stored in the memory 120 may be delete.

The memory 120 may also store a personal encryption key corresponding to the external device 200 generated by the processor 130.

The processor 130 may include various processing circuitry and be connected to the communicator 110 and the memory 120 to control the overall operation of the access point 100. For example, the processor 130 may acquire information on the public encryption key corresponding to the external device from the user terminal 300 through the communicator 110 by executing at least one command stored in the memory 120. When a communication connection using the public encryption key is requested from the external device 200, the processor 130 may perform a communication connection with the external device 200 using the public encryption key through the communicator 110. The processor 130 may generate a personal encryption key corresponding to the external device 200 during the communication connection using the public encryption key. The processor 130 may control the communicator 110 to transmit the generated personal encryption key to the external device 200. When a communication connection using the personal encryption key is requested from the external device 200 after the communication connection using the public encryption key is terminated, the processor 130 may perform the communication connection with the external device 200 using the personal encryption key through the communicator 110.

For example, the processor 130 may obtain information on public encryption key corresponding to the external device 200 from the user terminal 300. The public encryption key may be an encryption key that can perform a communication connection with the access point 100 when the access point 100 is in the public encryption key allowance mode. The public encryption key may be an encryption key given when the external device 200 is manufactured, but it is not limited thereto. The public encryption key may be set through a communication connection application executed by the user terminal 300.

Based on information on the public encryption key being obtained, the processor 130 may switch the communication mode of the access point 100 to the public encryption key allowance mode. The public encryption key allowance mode may be a mode for allowing a communication connection using a public encryption key, in addition to a unique master encryption key assigned to the access point 100. The public encryption key allowance mode may be maintained during a period of time set by the user.

When the communication connection using the public encryption key is requested from the external device 200 while the public encryption key allowance mode is maintained, the processor 130 may perform a communication connection with the external device 200 using the public encryption key through the communicator 100. For example, the processor 130 may receive a communication connection request signal including information on the public encryption key corresponding to the external device 200 from the external device 200. The processor 130 may authenticate the external device 200 based on the information on the public encryption key included in the communication connection request signal and the public encryption key corresponding to the external device 200 received from the user terminal 300. The processor 130 may perform a communication connection with the external device 200 using the public encryption key.

Based on the communication connection using the public encryption key being performed, the processor 130 may generate a personal encryption key corresponding to the external device 200 in order to perform communication with the external device 200. The personal encryption key is an encryption key that is assigned to the external device 200 for communication connection of the external device 200. The personal encryption key may be used to temporarily perform a communication connection with the access point 100 in addition to the master encryption key of the access point 100. For example, in order to enhance the security, the processor 130 may use the information (e.g., SSID information, product name, etc.) of the external device 200 and generate a person encryption key corresponding to the external device 200. However, this is merely an example embodiment, and a personal encryption key can be generated through a separate hash function, and it will be understood that the disclosure is not limited thereto.

The processor 130 may control the communicator 110 to transmit the personal encryption key corresponding to the external device 200 to the external device 200. The processor 130 may control the communicator 110 to transmit information on the access pointer 100 to the external device 200 in addition to the personal encryption key corresponding to the external device 200.

If a predetermined time elapses or a personal encryption key corresponding to the external device 200 is transmitted to the external device 200, the processor 130 may terminate the public encryption key allowance mode. When the public encryption key allowance mode is terminated, the processor 130 may terminate the communication connection with the external device 200 using the public encryption key. Alternatively, when the personal encryption key is transmitted to the external device 200, the processor 130 may terminate the communication connection using the public encryption key.

When the communication connection with the external device 200 using the public encryption key is terminated, the processor 130 may delete the public encryption key from the memory 120.

When a communication connection using a personal encryption key corresponding to the external device 200 is requested from the external device 200, the processor 130 may perform a communication connection with the external device 200 using the personal encryption key. The processor 130 may perform a communication connection using the personal encryption key using the information on the access point 100 as well as the personal encryption key corresponding to the external device 200. The personal encryption key may be continuously stored in the memory 120 even if the communication connection with the external device 200 using the personal encryption key is terminated.

Figure 3B:
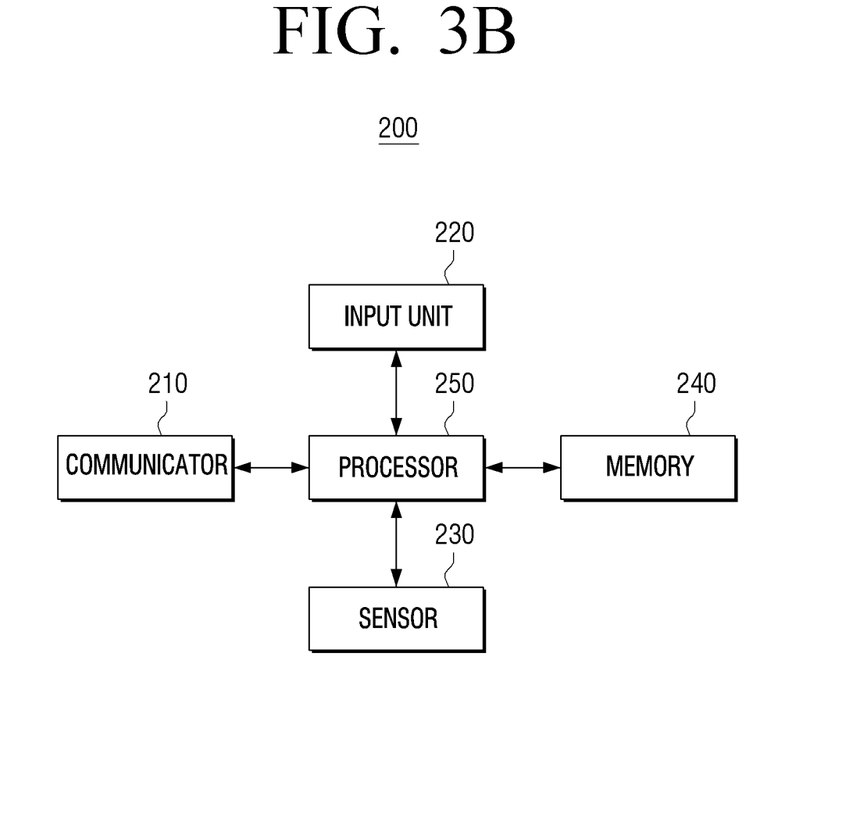
FIG. 3B is a block diagram illustrating an example configuration of an external device according to an embodiment of the disclosure.

FIG. 3B is a block diagram illustrating an example configuration of an external device according to an embodiment of the disclosure. The external device 200 may include a communicator (e.g., including communication circuitry) 210, an input unit (e.g., including input circuitry) 220, a sensor 230, a memory 240, and a processor (e.g., including processing circuitry) 250, as illustrated in FIG. 3B. The configurations illustrated in FIG. 3B are illustrative examples for implementing various example embodiments of the disclosure, and appropriate hardware/software configurations that will be apparent to a person skilled in the art can be additionally included in the external device 200. According to an embodiment of the disclosure, the external device 200 may be an IoT device that does not have an output device such as a display device, but this is only an example and may be implemented as other home appliances.

The communicator 210 may include various communication circuitry and establish communication with the access point 100. The communicator 210 may be implemented as various chips including various communication circuitry, such as, for example, and without limitation, a Wi-Fi chip. For example, the Wi-Fi chip of the communicator 210 may retrieve the access point 100 through the beacon message received from the external access point 100, and perform a communication connection with the retrieved access point 100 using an encryption key. In addition, the Wi-Fi chip may receive and transmit various connection information such as an SSID and an encryption key, establish communication based on the connection information, and then transmit and receive various information.

The communicator 210 may transmit a signal for requesting a communication connection to the access point 100. The signal may include one of a public encryption key and a personal encryption key. In addition, the communicator 210 may perform a communication connection with the access point 100 by receiving a communication connection response signal in response to the communication connection request signal. The communicator 210 may receive information on the personal encryption key corresponding to the external device 200 from the access point 100.

The input unit 220 may include various input circuitry and receive a user command and transmit the user command to the processor 250. The input unit 220 may include a configuration for accessing an access point. In this example, the input unit 220 may be implemented as an input device including various input circuitry, such as, for example, and without limitation, a physical button, an optical device, a keypad, or the like.

The sensor 230 may obtain various external status information. For example, the sensor 230 may include various sensors, such as, for example, and without limitation, a motion sensor, a proximity sensor, a temperature sensor, a humidity sensor, a gas sensor, and the like, to sense various external status information.

The memory 240 may store at least one command or data related to at least one other component of external device 200. The memory 240 may, for example, and without limitation, be implemented with a non-volatile memory, a volatile memory, a flash memory, a hard disk drive (HDD), a solid state drive (SSD), or the like. The memory 240 may be accessed by the processor 250 and reading/writing/modifying/deleting/updating operations of data may be performed by the processor 250. The term 'memory' in this disclosure may include, for example, and without limitation, the memory 240, and a memory card (not shown) (e.g., a micro SD card, a memory stick, etc.) mounted in ROM (not shown), RAM (not shown) or the access point 100 in the processor 250.

The memory 240 may store information on a public encryption key and a personal encryption key for performing communication connection with an access point.

The processor 250 may include various processing circuitry and control the overall operations of the external device 200 in connection with the communicator 210, the input unit 220, the sensor 230 and the memory 240. The processor 250 may execute at least one command stored in the memory 240, transmit a beacon message, and retrieve at least one external access point.

The processor 250 may control the communicator 210 to cause an access point with a high signal intensity among the retrieved at least one access point to transmit a communication connection request signal. The communication connection request signal may include information on a public encryption key.

When the communication connection response signal is received in response to the communication connection request signal including the information on the public encryption key, the processor 250 may perform a communication connection with the access point 100 that transmits the communication connection response signal. The access point 100 that transmits the communication connection response signal may be an access point of which mode is switched to a public encryption key allowance mode.

The processor 250 may acquire information on a personal encryption key corresponding to the external device 200 from the access point 100 through the communicator 210 while performing a communication connection using a public encryption key. The processor 250 may store the personal encryption key in the memory 240.

Based on the communication connection using the public encryption key being terminated, the processor 250 may control the communicator 210 to transmit a communication connection request signal including information on the personal encryption key to the access point 100. When the communication connection response signal is received from the access point 100, the processor 250 may perform a communication connection using the personal encryption key through the communicator 210.

Figure 3C:
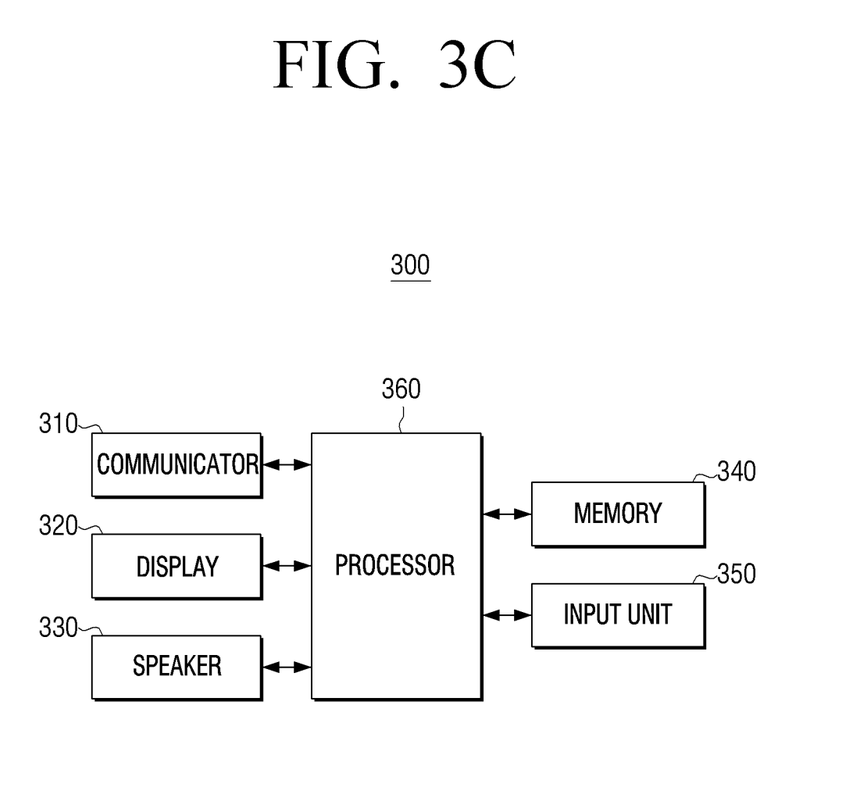
FIG. 3C is a block diagram illustrating an example configuration of a user terminal according to an embodiment of the disclosure.

FIG. 3C is a block diagram illustrating an example configuration of a user terminal according to an embodiment of the disclosure. Referring to FIG. 3C, the user terminal 300 may include a communicator (e.g., including communication circuitry) 310, a display 320, a speaker 330, a memory 340, an input unit (e.g., including input circuitry) 350 and a processor (e.g., including processing circuitry) 360. The configurations illustrated in FIG. 3C are illustrative examples of the example embodiments of the disclosure, and appropriate hardware/software configurations that will be apparent to those skilled in the art can be further included in the user terminal 300.

The communicator 310 may include various communication circuitry and perform a communication connection with various external devices. The communicator 310 may be implemented with various chips including various communication circuitry, such as, for example, and without limitation, a Wi-Fi chip, or the like. For example, the Wi-Fi chip of the communicator 310 may retrieve the access point 100 through the beacon message received from the external access point 100, and perform a communication connection with the retrieved access point 100 using an encryption key. In addition, the Wi-Fi chip may transmit and receive various connection information such as an SSID and an encryption key, establish communication connection using the connection information, and transmit and receive various information after communicating using the connection information. The communicator 310 is implemented as a Wi-Fi only by way of example, but may be implemented by other communication chips (e.g., 3rd Generation (3G), 3rd Generation Partnership Project (3GPP), Long Term Evolution (LTE), etc.).

The communicator 310 may perform a communication connection with the access point 100 using a master encryption key, and transmit the public encryption key corresponding to the external device 200 to the access point 100.

The display 320 may provide various screens. The display 320 may display a UI for acquiring a public encryption key corresponding to the external device 200. Meanwhile, the display 130 may be implemented as various types of displays such as, for example, and without limitation, a liquid crystal display (LCD), an organic light emitting diode (OLED) display, a plasma display panel (PDP), or the like. The display 110 may include a driving circuit, a backlight unit, and the like, which may be implemented in the form of an a-si TFT, a low temperature poly silicon (LTPS) TFT, an organic TFT (OTFT). The display 130 may be implemented as a touch screen in combination with a touch panel.

The speaker 300 may be configured to output various alarming sounds and voice messages as well as various audio data in which various processing tasks such as decoding, amplification, noise filtering, etc. are performed. An output terminal configured to output audio data may be further included as a configuration to output audio.

The memory 340 may store commands or data related to at least one other component of the user terminal 300. The memory 340 may be implemented with, for example, and without limitation, a non-volatile memory, a volatile memory, a flash memory, a hard disk drive (HDD), a solid state drive (SSD), or the like. The memory 340 may be accessed by the processor 360 and reading/writing/modifying/deleting/updating operations of data by the processor 360 may be performed. The term 'memory' in this disclosure may include, for example, and without limitation, the memory 340, and a memory card (not shown) (e.g., a micro SD card, a memory stick, etc.) mounted in ROM (not shown), RAM (not shown) or the access point 100 in the processor 360. The memory 340 may store various programs and data for performing cooperative transmission data communication. The memory 340 may store data for an application for performing a communication connection.

The input unit 350 may include various input circuitry and receive various user inputs and transmit the user inputs to the processor, and may include, for example, and without limitation, a touch sensor, a (digital) pen sensor, a pressure sensor, a key, a microphone, or the like. The touch sensor may use, for example, and without limitation, at least one of an electrostatic type, a pressure sensitive type, an infrared type, an ultrasonic type, or the like. The (digital) pen sensor may be, for example, part of a touch panel or may include a separate recognition sheet. The key may include, for example, and without limitation, a physical button, an optical key, a keypad, or the like. The microphone may be configured to receive a user voice, and provided inside the user terminal 300, it is not limited thereto. The microphone may be provided outside the user terminal 300 and electrically connected to the user terminal 300.

A camera for capturing the outside may be further included as the input unit 350. The input unit 350 may further include a camera for capturing a bar code or a QR code including information on a public encryption key corresponding to the external device 200.

The processor 360 may include various processing circuitry and control the overall operations of the user terminal 300 in connection with the communicator 310, the display 320, the speaker 330, the memory 340 and the input unit 350. The processor 360 may execute at least one command stored in the memory 340 and execute an application for communication connection. The processor 360 may acquire information on the public encryption key corresponding to the external device 200 according to a user input received through an execution screen of an application.

The information on the public encryption key may, for example, and without limitation, be on the external device 200, on a package of the external device 200, or the like and may be directly input by a user or acquired, for example, and without limitation, through a bar code, a QR code, or the like captured by a camera.

The processor 360 may control the communicator 310 to transmit acquired information on the public encryption key to the access point 100.

Figure 4:
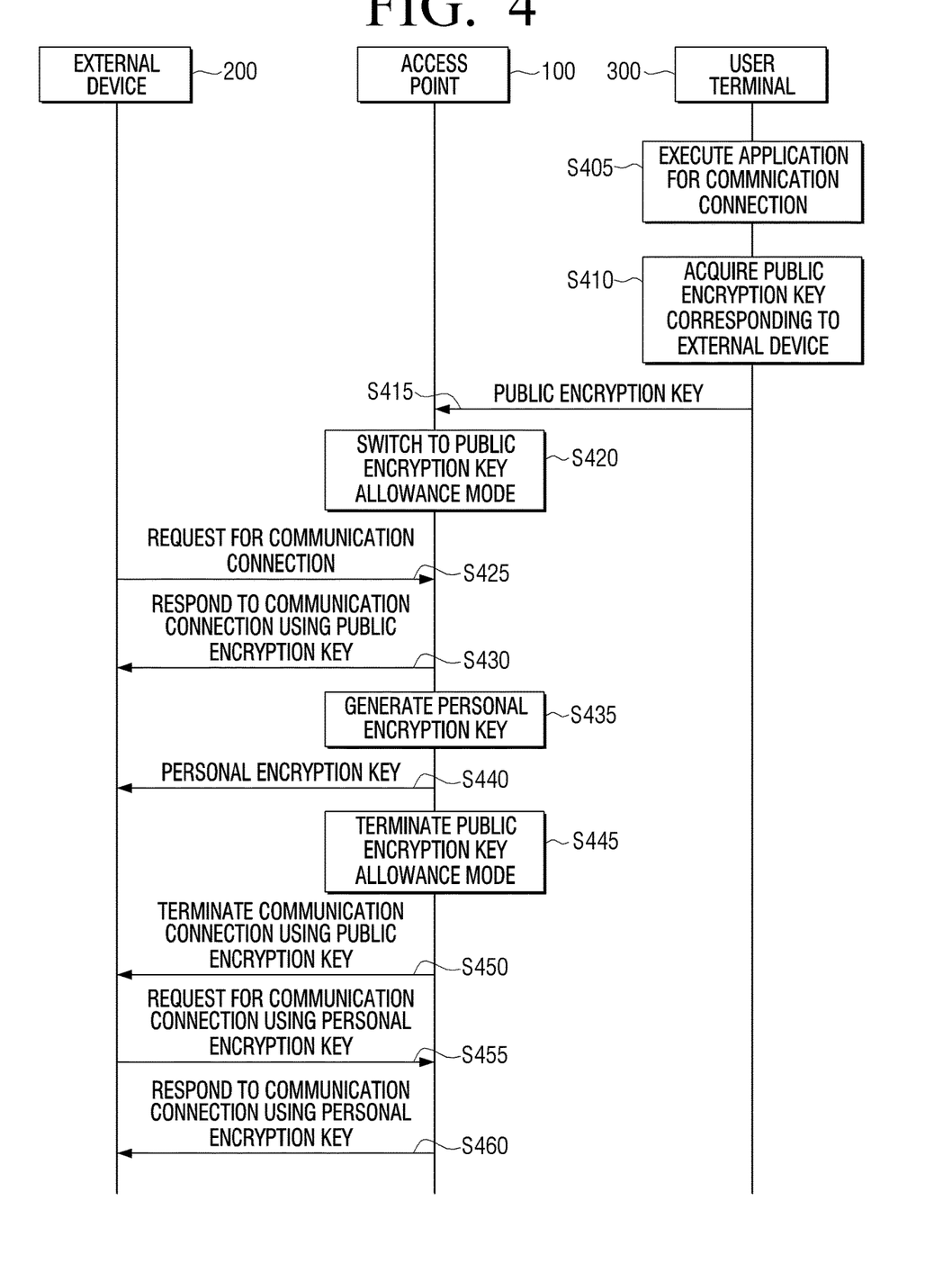
FIG. 4 is a sequence diagram illustrating an example method for accessing to an access point by an external device according to an embodiment of the disclosure.

FIG. 4 is a sequence diagram illustrating an example method for accessing an access point of an external device according to an embodiment of the disclosure.

The user terminal 300 may execute an application for communication connection at step S405. The user terminal 300 may be in communication connection with the access point 100 using a master encryption key.

Figure 5A:
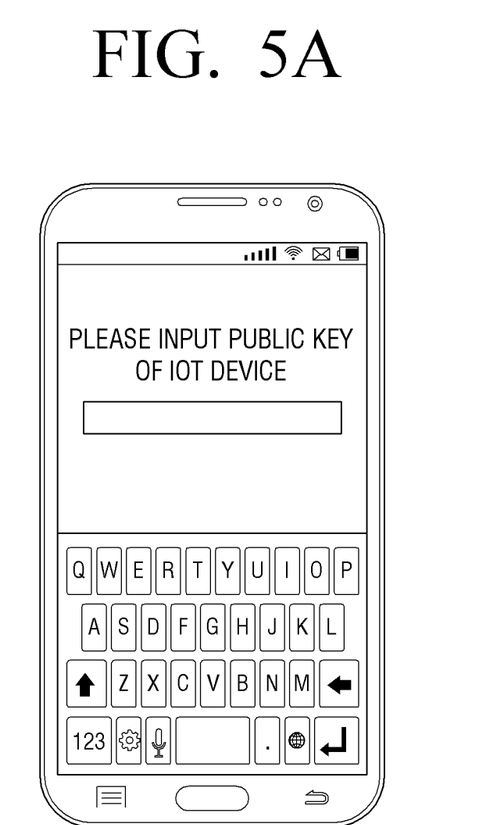
FIG. 5A is a diagram illustrating an example of a public encryption key corresponding to a user terminal being acquired through a user terminal according to an embodiment of the disclosure.
Figure 5B:
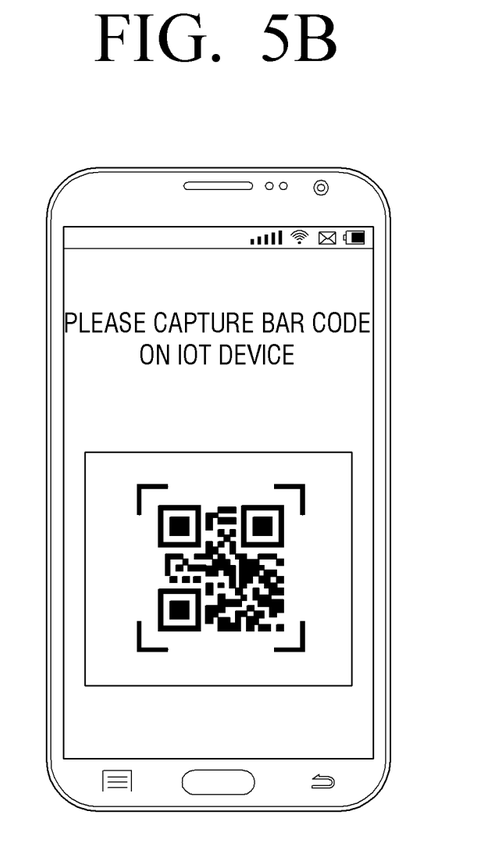
FIG. 5B is a diagram illustrating an example of a public encryption key corresponding to a user terminal being acquired through a user terminal according to an embodiment of the disclosure.

The user terminal 300 may acquire a public encryption key corresponding to an external device at step S410. As illustrated in FIG. 5A, the user terminal 300 may display a UI that guides a user to directly input a public encryption key, and acquire information on a public encryption key according to a user input received through the UI. As illustrated in FIG. 5B, the user terminal 300 may display a UI for capturing a QR code or a bar code included in the external device 200 or the package of the external device 200 (e.g., a box), and acquire information on the public encryption key through the captured QR code or bar code. According to another example embodiment of the disclosure, the user terminal 300 may directly receive information on the public encryption key from the external device 200 connected, for example, in a Wi-Fi direct method.

The user terminal 300 may transmit the information on the public encryption key to the access point 100 at step S415.

When the information on the public encryption key is received, the access point 100 may switch a mode to a public encryption key allowance mode at step S420. The public encryption key allowance mode may be a mode to access an access point using a public encryption key other than a master encryption key for a predetermined duration.

The external device 200 may request a communication connection using a public encryption key as an access point at step S425. The external device 200 may request a communication connection using a public encryption key from an access point having a high signal intensity (e.g., RSST) among the retrieved at least one access point. The communication connection request signal may include information on the public encryption key.

While maintaining the public encryption key allowance mode, the access point 100 may respond to the external device 200 for the communication connection using the public encryption key to in response to the received communication connection request signal at step S430. The access point 100 may perform a communication connection with the external device 200 using the public encryption key.

The access point 100 may generate a personal encryption key while performing communication connection using the public encryption key at step S435. The personal encryption key may be generated based on information on the external device 200.

The access point 100 may transmit the generated personal encryption key to the external device 200 at step S440. The access point 100 may transmit information on the access point 100 (e.g., SSID information of the access point 100 and Mac address information of the access point 100) as well as the personal encryption key.

The access point 100 may terminate a public encryption key allowance mode at step S445. The access point 100 may delete the public encryption key received from the user terminal 300.

The access point 100 may terminate communication connection with the external device 200 using the public encryption key in step S450.

After the communication connection using the public encryption key is terminated, the external device 200 may request a communication connection using a public encryption key at step S455. The communication connection request signal may include information on a personal encryption key. In addition, the communication connection request signal may also include information on the access point.

The access point 100 may transmit a communication connection response signal in response to a communication connection request signal at step S460. The access point 100 may perform a communication connection with the external device 200 using a personal encryption key.

As described above, after the communication connection is performed temporarily using the public encryption key, final communication connection may be performed using the personal encryption key. Accordingly, there is no need to store a master encryption key of the access point 100 in an external device, and thus the security may be enhanced. When a plurality of external devices have the same public encryption key, the user may input the public encryption key for the plurality of external devices only once, so that the plurality of external devices access the access point 100 at once.

Figure 6:
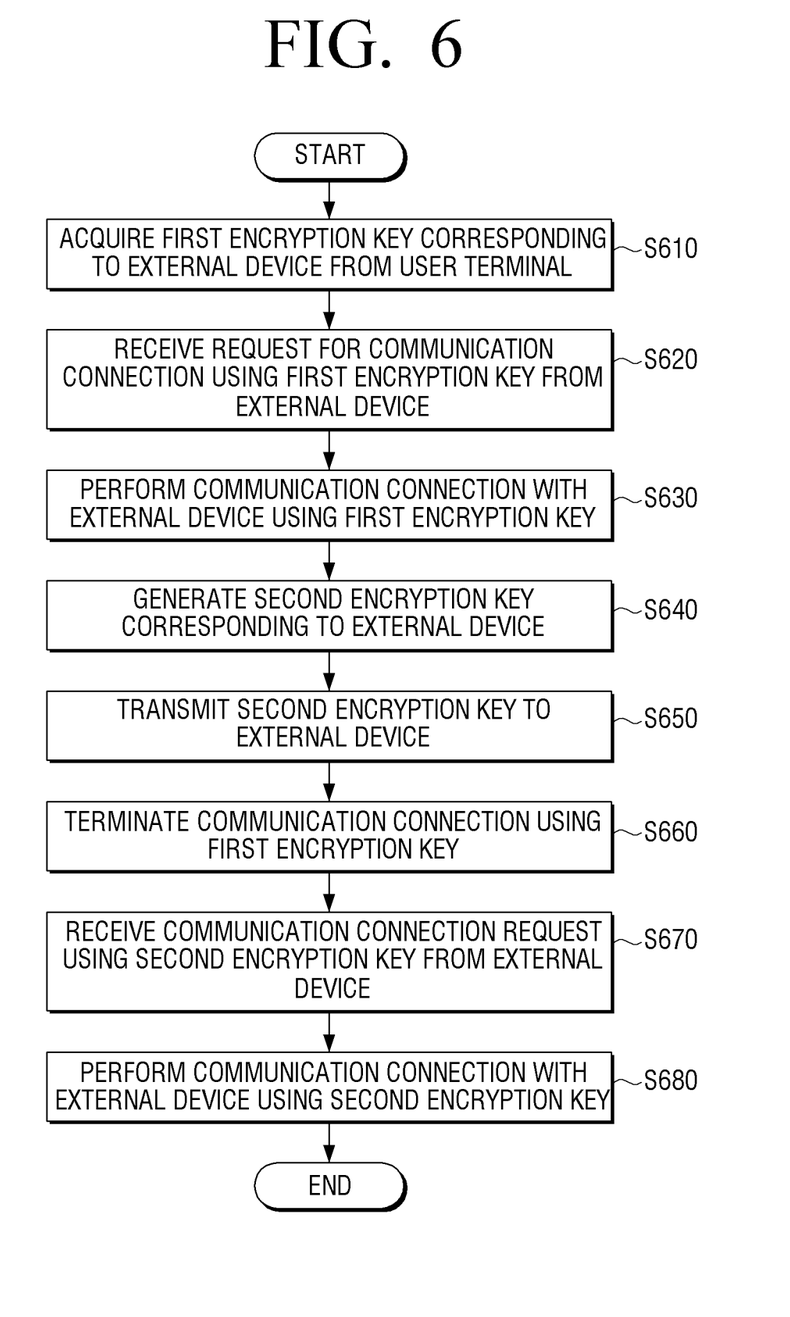
FIG. 6 is a flowchart illustrating an example communication connection method of an access point according to an embodiment of the disclosure.

FIG. 6 is a flowchart illustrating an example communication connection method of an access point according to an embodiment of the disclosure.

The access point 100 may acquire information on a first encryption key (e.g., a public encryption key) corresponding to the external device 200 from the user terminal 300 at step S610. When receiving the first encryption key, the access point 100 may enter a first encryption key allowance mode.

The access point 100 may receive a communication connection request using the first encryption key from the external device 200 at step S620. The communication connection request signal may include information on the first encryption key.

The access point 100 may perform a communication connection with the external device 200 using the first encryption key at step S630. The access point 100 may authenticate the external device 200 by comparing the first encryption key included in the communication connection request signal with the first encryption key received from the user terminal 300. The access point 100 may transmit a communication connection response signal in response to a communication connection request signal and perform a communication connection with the external device 200 using the first encryption key.

The access point 100 may generate a second encryption key (e.g., a personal encryption key) corresponding to the external device 200 at step 5640. The access point 100 may generate information on the second encryption key based on the information on the external device 200 while communication connection using the first encryption key is performed.

The access point 100 may transmit the second encryption key to the external device 200 at step S650. The access point 100 may transmit information on the access point 100 together with the second encryption key.

The access point 100 may terminate a communication connection using the first encryption key at step S660. In other words, when transmitting the second encryption key, the access point 100 may terminate the first encryption key allowance mode, terminate a communication connection using the first encryption key, and delete the information on the first encryption key.

The access point 100 may receive a request for communication connection using the second encryption key from the external device 200 at step S670. The access point 100 may authenticate the external device 200 by comparing a second encryption key included in the communication connection request signal with a pre-stored second encryption key. The access point 100 may transmit a communication connection response signal in response to a communication connection request signal and perform a communication connection with the external device 200 using the second encryption key. In order to authenticate the external device 200, information on the access point may be further included in the communication connection request signal.

The access point 100 may perform a communication connection with the external device 200 using the second encryption key at step S680. The access point 100 may transmit a communication connection response signal in response to a communication connection request signal and perform a communication connection with the external device 200 using the second encryption key.

Various embodiments of the disclosure may be embodied as software including commands stored in a machine-readable storage media that can be read by a machine (e.g., a computer). The device may include an electronic device (e.g., an access point 100, an external device 200, and a user terminal 300) in accordance with the disclosed embodiments, which is an apparatus that can call stored commands from the storage medium and operate according to the called commands. When the command is executed by a processor, the processor may perform the function corresponding to the command, either directly or using other components under the control of the processor. The commands may include codes made by a compiler or executed by an interpreter. The machine-readable storage medium may be provided in the form of a non-transitory storage medium.

According to an example, a method according to various embodiments disclosed herein may be provided in a computer program product. The computer program product may be traded between a seller and a purchaser as a product. The computer program product may include a machine readable storage medium (e.g., compact disc read only memory (CD-ROM)) that can be read by a device, or a program that can be transmitted over a wired or wireless network. For example, a computer program product may be distributed online via an application store (e.g., PlayStore™) and a computer may download at least a portion of the computer program product and store the portion of the computer program product in the memory of the computer. In the case of on-line distribution, at least a portion of the computer program product may be temporarily stored, or temporarily generated, in a storage medium such as a manufacturer's server, a server of an application store, or a memory of a relay server.

Each of the components (e.g., modules or programs) according to various embodiments may include a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that various changes in form and details may be made to these example embodiments without departing from the principles and spirit of the present disclosure. Accordingly, the scope of the present disclosure is not being limited to the described example embodiments, but may be defined, for example, by the appended claims as well as equivalents thereto.

What is claimed is:

1. A communication connection method of an access point, comprising:
    acquiring information of a first encryption key corresponding to an external device from a user terminal;
    performing the communication connection with the external device using the first encryption key based on a request for communication connection using the first encryption key being received from the external device;
    generating a second encryption key corresponding to the external device while the communication connection using the first encryption key is performed;
    transmitting the generated second encryption key to the external device; and
    performing the communication connection with the external device using the second encryption key based on a request for a communication connection using the generated second encryption key being received from the external device after the communication connection using the first encryption key is terminated.

2. The method as claimed in claim 1, further comprising:
    switching a communication mode of the access point to a first encryption key allowance mode based on the information of the first encryption key being acquired,
    wherein the performing of the communication connection using the first encryption key comprises, performing the communication connection with the external device using the first encryption key based on the request for the communication connection using the first encryption key being received from the external device while the first encryption key allowance mode is maintained.

3. The method as claimed in claim 2, wherein the first encryption key allowance mode is maintained during a period of time set through the user terminal.

4. The method as claimed in claim 2, further comprising:
    terminating the communication connection with the external device using the first encryption key based on the generated second encryption key being transmitted and/or the first encryption key allowable mode being terminated.

5. The method as claimed in claim 4, further comprising:
    deleting the first encryption key based on the communication connection with the external device using the first encryption key being terminated.

6. The method as claimed in claim 1, wherein the generating comprises generating
    the second encryption key corresponding to the external device based on information of the external device.

7. The method as claimed in claim 1, wherein the transmitting comprises
    transmitting information of the access point together with the second encryption key corresponding to the external device, and
    wherein the performing of the communication connection using the second encryption key comprises performing the communication connection with the external device using the second encryption key using the information of the access point and the second encryption key corresponding to the external device.

8. The method as claimed in claim 1, wherein the second encryption key is stored regardless of whether the communication connection with the external device using the second encryption key is terminated or not.

9. The method as claimed in claim 1, wherein the external device comprises an Internet of Things (IOT) device without a display.

10. An access point, comprising:
    a communicator comprising communication circuitry;
    a memory including at least one command; and
    a processor connected to the communicator and the memory, the processor being configured to control the access point,
    wherein the processor, by executing the at least one command, is further configured to control the access point to:
    acquire information on a first encryption key corresponding to an external device from a user terminal through the communicator, perform a communication connection with the external device using the first encryption key through the communicator based on a request for communication connection using the first encryption key being received from the external device, generate a second encryption key corresponding to the external device while the communication connection using the first encryption key is performed, control the communicator to transmit the generated second encryption key to the external device, and perform communication connection with the external device using the second encryption key through the communicator based on a request for communication connection using the second encryption key being received from the external device after the communication connection using the first encryption key is terminated.

11. The access point as claimed in claim 10, wherein the processor is further configured to control the access point to:

switch a communication mode of the access point to a first encryption key allowance mode based on the information on the first encryption key being acquired, and perform the communication connection with the external device using the first encryption key through the communicator based on the request for the communication connection using the first encryption key being received from the external device while the first encryption key allowance mode is maintained.

12. The access point as claimed in claim 11, wherein the first encryption key allowance mode is maintained during a period of time set through the user terminal.

13. The access point as claimed in claim 11, wherein the processor is configured to control the access point to terminate the communication connection with the external device using the first encryption key based on the generated second encryption key being transmitted and/or the first encryption key allowance mode being terminated.

14. The access point as claimed in claim 12, wherein the processor is configured to control the access point to delete the first encryption key based on the communication connection with the external device using the first encryption key being terminated.

15. The access point as claimed in claim 10, wherein the processor is configured to control the access point to generate the second encryption key corresponding to the external device based on information on the external device.

16. The access point as claimed in claim 10, wherein the processor is further configured to control the access point to:

control the communicator to transmit the second encryption key corresponding to the external device together with information of the access point, and perform the communication connection with the external device using the second encryption key using the information of the access point together with the second encryption key corresponding to the external device.

17. The access point as claimed in claim 10, wherein the second encryption key is stored in the memory regardless of whether the communication connection with the external device using the second encryption key is terminated or not.

18. The access point as claimed in claim 10, wherein the external device comprises an Internet of Things (IOT) device without a display.

* * * * *